United States Patent [19]

Sadler

[11] 3,715,230

[45] Feb. 6, 1973

[54] DUAL TREATMENT OF ASBESTOS FIBERS

[75] Inventor: Thomas Harry Sadler, Belle Mead, N.J.

[73] Assignee: Johns-Manville Corporation, New York, N.Y.

[22] Filed: Feb. 12, 1971

[21] Appl. No.: 115,136

Related U.S. Application Data

[63] Continuation-in-part of Ser. No. 879,549, Nov. 24, 1969, abandoned.

[52] U.S. Cl. .........117/70 S, 117/70 R, 117/126 AQ, 117/126 AF, 162/153, 162/154
[51] Int. Cl. ................................................B44d 1/16
[58] Field of Search .....117/126 AQ, 126 AF, 169 A, 117/169 R, 70 R, 69; 162/154, 155

[56] References Cited

UNITED STATES PATENTS

| 3,173,831 | 3/1965 | Pundsack et al. | 162/154 |
| 2,198,800 | 4/1940 | Badollet | 162/155 |
| 2,220,386 | 11/1940 | Badollet | 162/154 |
| 2,582,840 | 1/1952 | Maxwell | 162/155 |

FOREIGN PATENTS OR APPLICATIONS 887,997   1/1962   Great Britain

Primary Examiner—Alfred L. Leavitt
Assistant Examiner—Cameron K. Weiffenbach
Attorney—John A. McKinney, Robert M. Krone, Joseph J. Kelly and Ronald M. Halvorsen

[57] ABSTRACT

Treatment of asbestos fiber with a first coating of at least about 0.4 percent by weight of alkali-metal silicate solids or colloidal silica, and subsequent distribution of a non-foaming anionic dispersant on the coated fiber produces an asbestos fiber product that possesses improved filtration properties. The fiber product improves the production rate of articles from asbestos-cement slurries or pastes and eliminates the loss in strength of asbestos-cement articles that usually results from inclusion of silicate-treated fibers in the slurries or pastes.

10 Claims, No Drawings

DUAL TREATMENT OF ASBESTOS FIBERS

CROSS-REFERENCES TO RELATED APPLICATIONS

This application is a continuation-in-part of copending co-assigned application Ser. No. 879,549, filed Nov. 24, 1969, now abandoned.

BACKGROUND OF THE INVENTION

This invention relates to providing asbestos fibers with improved filtration characteristics, and in particular the invention is directed to improved methods of treating asbestos fibers and to the improved fibers so produced. While the invention finds particular use in the manufacture of asbestos-cement articles by the filtration of particulate materials from a slurry containing asbestos fibers, hydraulic cement, and silica, and in the manufacture of asbestos-cement pipe using chrysotile as the major fiber component of such a slurry, it is to be understood that in its broader aspects the invention can be employed in the manufacture of a variety of asbestos-containing articles.

Asbestos has for some years been employed in a number of common products such as asbestos-cement boards, sheets, shingles, pipe, etc.; and paper and millboard which are produced by so-called "wet" or "dry" processes that include filtration or percolation-type procedures in which a liquid, typically water, is withdrawn from within a mass or body including asbestos fibers. Exemplary of such manufacturing procedures is the wet process which conventionally involves the steps of forming an aqueous slurry of asbestos fibers and Portland cement in water, flowing the slurry onto a filter element upon which the dispersed solids of the slurry may be collected, removing water in the slurry through the filter element by filtration, and then removing the formed mass of asbestos fibers and cement from the filter element. Because of inhibition of the filtering by the asbestos fibers and finely divided cement particles, there are very practical limitations upon the thicknesses of the resulting layers which can be collected on filter elements in this fashion. Thus, as the collected mass builds up on the filter element, the rate of filtration rapidly decreases, making it impractical to form structures of any great thickness with a rate of throughput which must be obtained in commercial operations.

In a conventional dry process used to form asbestos-cement articles, the dry materials, such as asbestos, silica, cement, and pigment are blended together and formed into batches by weight. Sufficient water is added to each batch to form a plastic paste which can be molded, calendered, pressed or extruded prior to standard asbestos-cement curing operations.

The filtration properties of chrysotile asbestos fibers differ substantially with the source or mine location as well as by type, grade and consistency, ranging from the relatively fast filtering "harsh" fiber to slow filtering "soft" fiber. Typical of the latter class of fiber are asbestos materials found in the Quebec, Canada area. The filtration characteristics of chrysotile asbestos are a significant consideration in determining the suitability or utility of a particular fiber or fiber blend in wet process and dry process manufacturing procedures, and these characteristics are particularly decisive in the conventional wet machine processes which are normally employed in the production of asbestos-cement pipe, sheets, board, and paper type products, as well as molded or pressed products.

In the past, a large number of treatment methods have been proposed and evaluated to increase the filtration rate of the slower filtering fibers. They include thermal treatment of the fiber; the application of assorted coatings to the fiber; the use or organic coagulating agents and inorganic salt solutions; and soaking in sodium silicate solutions followed by dewatering with an acid treatment to minimize the accelerating effect of sodium silicate on hydraulic cement. However, notwithstanding the disadvantages entailed in the utilization of the slower filtration fiber in wet machine processes, only a very few of these treatment methods for upgrading the filtration characteristics of asbestos fiber have been extensively adopted. Two of these procedures are described below.

It has previously been found that a non-foaming anionic dispersant can be added to a slurry or paste containing asbestos fibers to increase the rate at which water can be removed from the slurry or paste. While this process has been use commercially and produces the desired results, increased filtration rates, it has been found that the effect of the non-foaming anionic dispersant is not cumulative. That is, while increased filtration rates result from addition of the dispersant up to a certain weight percentage level, once that level is reached, further addition of the dispersant does not result in additional increases in the filtration rate. Thus, there is an upper limit on the maximum filtration rate for a given slow-filtering asbestos fiber that is obtainable by this process.

The silicate treatment of asbestos fibers increases filtration rates, but results in considerable decreases in strength of products incorporating the treated fiber when large quantities of silicates are added in an effort to greatly increase filtration rates. A preferred silicate treatment procedure, which is used commercially but can nonetheless result in asbestos-cement products of decreased strength at high silicate levels is described in U.S. Letters Pat. No. 3,173,831. This method of spraying a silicate solution onto asbestos fibers greatly improves the filtration characteristics of chrysotile asbestos fiber, but has a strength-decreasing effect on asbestos-cement products. Thus, for practical purposes it is desirable to arrive at a compromise of a 0.4 – 0.6 percent by weight silicate treatment which does help fiber filterability without a prohibitive decline in product strength. Higher amounts of silicate progressively improved filtration properties, but resulting strength losses make the higher amount of silicate impractical.

Thus, while the addition of a non-foaming anionic dispersant, or the deposition of about 0.4 – 0.6 percent or less by weight of silicate have been used commercially to improve production rates of asbestos-cement articles from slow filtering asbestos fibers, inherent process limitations have prevented either of these procedures from producing slurries or pastes that provide both rapid filtration and strong products.

OBJECTS OF THE INVENTION

Accordingly, it is an object of this invention to provide an effective procedure for greatly increasing the filtration rate of slurries or pastes containing asbestos fiber, without having the adverse effect on product strength that would result from a silicate treatment and most other known filtration-improving treatments.

Another object of this invention is to provide asbestos fibers which possess improved filtration characteristics for use in making asbestos-cement products, and which do not result in lower strength products as a direct result of the improved filterability properties of the fibers.

A further object of this invention is to provide a process for imparting to asbestos fibers desirable filtration properties while eliminating the loss in product strength that previously resulted from attempts to dramatically increase filtration rates by silicate and other treatment procedures.

These and other objects will be apparent to those skilled in the art from the description which follows and from the drawings.

SUMMARY OF THE INVENTION

The invention provides a novel asbestos fiber product and a method of producing an asbestos fiber product that possesses desirable filtration characteristics for use in fabricating asbestos-cement articles from slurries or pastes. The method comprises applying an aqueous solution of alkali metal silicate to asbestos fiber while maintaining the fiber in an air suspension to deposit on the suspended fiber alkali metal silicate solids in amounts of at least about 0.4 percent by weight of the fiber, and subsequently depositing a non-foaming anionic dispersant on the fiber.

The combination treatment using alkali metal silicate and a non-foaming anionic dispersant is not only cumulative in its effect on the filtration rate of asbestos fibers, but unexpectedly does not decrease the strength of the treated fibers as do fibers of products made from the treated fibers as do fibers treated with the same level of alkali metal silicate alone. The dual treatment method of this invention permits usage of over 100 percent more alkali metal silicate than the 0.4 – 0.6 percent by weight range previously thought to be the commercially practicable upper limit. For example, chrysotile fibers treated with 1 percent sodium silicate, but no dispersant, possess improved filtration characteristics compared to untreated fibers, but asbestos-cement products made from such silicate-treated fibers are weaker than products made from untreated fiber and are unsatisfactory from a strength standpoint.

On the other hand, fibers treated with 1 percent sodium silicate and a non-foaming anionic dispersant according to the dual treatment process of the present invention have filtration characteristics superior to the 1 percent sodium silicate treated fibers, and also produce products that possess equal or superior strength characteristics when compared to products made from untreated fiber.

The invention dramatically increases production rates of products from an asbestos-cement slurry or paste and eliminates the loss of strength in asbestos-cement products formed from the slurry or pastes which would otherwise result from inclusion of silicate-treated asbestos fibers having more than about 0.4 – 0.6 percent by weight of silicate solids deposited on the fibers.

DETAILED DESCRIPTION OF THE INVENTION

The process of treating asbestos fiber according to the method of this invention includes as a first step the application of alkali metal silicate to the surface of the asbestos fibers. An aqueous solution containing alkali metal silicate is sprayed onto the asbestos fibers while the fibers are maintained in a gaseous suspension. This spray procedure has been found to be particularly desirable for applying alkali metal silicates to asbestos fiber, if the fiber is to be subsequently packaged and transported or stored before use.

The preferred procedure for depositing alkali metal silicates on the asbestos fibers is described in Pundsack et al. U.S. Pat. No. 3,173,831, assigned to the assignee of this invention. The disclosure of the Pundsack et al. patent is incorporated herein by reference. In general, the spray technique disclosed by Pundsack et al. which comprises the preferred first step in the present process involves the application of a sprayable aqueous solution of alkali metal silicates consisting of ordinary commercial grades of sodium and/or potassium silicates having alkali metal to silicate ratios ranging from about 1.60 to 3.75 mols $SiO_2$ per mol of alkali metal. The silicate solution is applied in the form of a finely divided atomized spray to the asbestos fibers. Although the patent describes the concentration of alkali metal silicate in the aqueous solution as being in the range of about 3 percent to about 20 percent by weight, it has been found in the present invention that considerably higher concentrations can be used, such as, for example, 30 percent and greater alkali metal silicate content.

While being sprayed, the fibers are maintained substantially individually in an air or gaseous suspension such as the condition that normally exists in an asbestos fiberizer, such as a willow, or when the fibers pass through a fan or blower. Alkali metal silicate solutions of the above described concentrations can be effectively sprayed in a finely divided or atomized condition from typical commercial equipment without clogging. The application of the silicate solutions as a finely divided spray to fibers in vigorous motion permits the addition of large quantities of the aqueous solution without producing any visible wetting or cohering of the fiber.

Up to 15–20 percent of the aqueous silicate solution, based on fiber weight, can be sprayed on the air suspended fiber. The total amount of solution applied depends upon the concentration of the solution. To produce the beneficial effects of the present invention up to 4 percent by weight of the alkali metal silicate solids and preferably from about 0.5 to about 2.0 percent by weight, is deposited on the fiber.

As discussed above, the application of alkali metal silicates to the surface of asbestos fibers in quantities of at least about 0.4 percent by weight of the fiber, substantially improves the filtration characteristics of the treated fiber when compared to untreated fiber. However, alkali metal silicate at these weight percentages has in the past tended to considerably decrease the strength of products incorporating the silicate-treated fiber.

In accordance with the invention, a non-foaming anionic dispersant is added to silicate-treated asbestos fibers to dual treat the fibers. This results in an increased filtration rate of slurries or pastes which include the dual treated fibers above the filtration rate of slurries or pastes which include silicate-only treated fibers, and an increase in the strength of asbestos-cement products formed from the dual treated fibers above the strength of similar products formed from the silicate-only treated fibers. By the addition of the non-foaming anionic dispersant to the silicate treated fibers, the loss of strength which would otherwise result from the use of silicate-only treated fibers is decreased.

The addition of the dispersant to the silicate-treated fibers can be accomplished by numerous physical procedures. An aqueous solution of the dispersant can be sprayed on the silicate-treated fibers while they are suspended using techniques similar to those described above for the silicate treatment. The dispersant can also be added as a dry, finely divided solid, and blown onto the silicate-treated asbestos fiber.

It has been found that a large number of non-foaming anionic dispersants are effective to increase the filterability of asbestos-cement slurries or pastes, and to counteract the strength loss in asbestos-cement articles which otherwise follows from a prior silicate treatment of asbestos fibers. Preferred dispersants include a sodium salt of condensed naphthalene sulfonic acid such as marketed by Rohm and Haas under the trade designation Tamol SN, hereinafter referred to at times as simply Tamol, and a sodium ligno-sulfonate marketed by the Marathon division of American Can Company under the trade designation Marasperse N-22; other suitable dispersants include a sulfonated benzimidazol derivative of a higher fatty acid marketed by Ciba Chemical and Dye Company, Inc. under the trade designation Ultravon WC; a sugar-free calcium lignosulfonate marketed by Lake States Yeast & Chemical Division, St. Regis Paper Company under the trade designation Toranil B; a sodium alkyl naphthalene sulfonate marketed by National Aniline Division, Allied Chemical Corporation under the trade designation Naccolsol A; an alkyl aryl sodium sulfonate marketed by National Aniline Division, Allied Chemical Corporation under the trade designation Naccotan A; a sodium salt of a condensed mononaphthalene sulfonate marketed by Jacques Wolf and Company, Division of Nopco Chemical Company under the trade designation Lomar PW; a sodium salt of a condensed naphthalene sulfonate marketed by Jacques Wolf and Company, Division of Nopco Chemical Company under the trade designation Nopcosant; a sodium salt of polymerized alkyl naphthalene sulfonic acid marketed by Dewey and Almy Chemical Division, W. R. Grace and Company under the trade designation Darvan No. 1; sodium salts of polymerized substituted benzoid alkyl sulfonic acid marketed by Dewey and Almy Chemical Division, W. R. Grade and Company under the trade designation Darvan No. 2; sodium salts of polymerized alkyl naphthalene sulfonic acid marketed by Dewey and Almy Chemical Division, W. R. Grace and Company under the trade designation Darvan No. 15; a mono-calcium salt of polymerized alkyl aryl sulfonic acids marketed by Dewey and Almy Chemical Division, W. R. Grace and Company under the trade designation Daxad No. 21; sodium salts of polymerized substituted benzoid alkyl sulfonic acids marketed by Dewey and Almy Chemical Division, W. R. Grace and Company under the trade designation Daxad No. 23; sodium salts of substituted benzoid alkyl sulfonic acids and suspending agent marketed by Dewey and Almy Chemical Division, W. R. Grace and Company under the trade designation Daxad No. 27; sodium salts of substituted benzoid alkyl sulfonic acids and suspending agent marketed by Dewey and Almy Chemical Division, W. R. Grace and Company under the trade designation Darvan No. 3; and a group comprising sulfonated naphthalene formaldehyde polymers such as a sulfonated condensate of naphthalene formaldehyde marketed by New York Color and Chemical Company, Division of American Dyewood, Inc. under the trade designation Syntan NNC; a sodium salt of a sulfonated naphthalene-formaldehyde condensate marketed by Dyestuff and Chemicals Division, General Aniline and Film Corporation under the trade designation Blancol; and a sodium salt of a sulfonated naphthalene-formaldehyde condensate marketed by Dyestuff and Chemicals Division, General Aniline and Film Corporation under the trade designation Blancol N. The foregoing materials including Tamol and Marasperse are classified as dispersants in the publication: *Detergents and Emulsifiers*, 1964 Annual, Copyright 1964 by John W. McCutcheon, Inc.

The non-foaming anionic dispersant added in the second step of this dual treatment process is effective to produce advantageous results at very low concentrations of from about 0.05 to 5.0 percent by weight based on the dry weight of the asbestos fiber. Larger amounts of the non-foaming anionic dispersant can be used, but the added additional amounts are superfluous and do not produce any added advantages. Furthermore, as the amount of the dispersant is increased, it begins to act in its normally intended manner as a dispersant and detrimentally affects the production rate at which asbestos-cement articles can be produced. The amount of dispersant used should not lower the surface tension of the asbestos cement slurry or paste below about 65 – 67 dynes/cm., as contrasted with the surface tension of ordinary water of about 72 dynes/cm., thus further preventing any tendency for the slurry to foam. The precise amount of the dispersant required to produce the desired results varies with the percentage of the particulate solids in the slurry or paste in which the asbestos fiber is to be incorporated and the nature of the particulate solids.

The asbestos fiber product produced by the abovedescribed process comprises at least about 0.4 percent by weight silicate solids at least partially coating the surface of the asbestos fibers, and a non-foaming anionic dispersant distributed as a coating on the surface of the silicate-coated fibers. The fiber product can be compressed during packaging operations and retains its ability to improve production rates and to produce strong asbestos cement articles through shipment and prolonged storage periods.

In a preferred embodiment of the present invention, chrysotile asbestos fibers are first coated by spraying an aqueous solution of sodium silicate onto the fibers to deposit about 0.75 percent by weight of silicate solids and the fibers are then coated with about 0.4 percent by weight of the non-foaming anionic dispersant, such as Tamol.

Portland cement is the principal hydraulic cementitious material used in carrying out the new method of preparing asbestos-cement structures in accordance with the invention. However, use of other hydraulic cements, e.g., pozzolanic cement, calcium aluminate cement and calcium sulphate cement, can be used, if desired, to replace at least part of the Portland cement.

Suitable asbestos-cement structures can be prepared using mixtures consisting essentially of the cement and asbestos fibers. However, it is often desirable from a viewpoint of cost, as well as structural properties of the final products, to include additional siliceous materials in the aqueous slurries and pastes so that they will constitute a part of the ultimate shaped structures. Consequently, sand, powdered silica, ground mica, ground feldspar and the like can be present in the slurry or paste.

The following examples are presented to provide a more complete understanding of the invention. The specific techniques, conditions, materials and/or proportions set forth are exemplary and should not be construed as limiting the scope of the invention. All percentages listed in this application are weight percentages unless stated to be otherwise.

EXAMPLES 1-4

A chrysotile asbestos fiber mined in Quebec, Canada is treated in accordance with the dual treatment process of the invention. The filtration characteristics of the resulting fiber are compared with untreated fiber and fiber treated with only silicate in Table I below.

An atomized 30 percent solution is sprayed on the tested fibers while the fibers are being transported in an air stream. The dispersant, a sodium salt of condensed naphthalene sulfonic acid (Tamol) in the dry powder form, is blown into the cyclone which is used to collect the silicate treated fibers and is distributed as a coating on the silicate treated fibers.

The treated fibers are tested for their Fiberator Index value, which results from a standard Johns-Manville Corporation filtration test which is used to determine the production rate properties of a fiber for use in wet machine operations. It is different in concept from a wet permeability test which merely measures the time elapsed for a given portion of liquid to pass through a filter mat, or established filter cake.

The Fiberator Index value is an empirical value obtained using a test apparatus comprising an open topped vessel having a side inlet opening, a side outlet opening, a bottom outlet and a screen covering the bottom outlet. A filtrate-collection flask connected to a vacuum source is connected to the bottom outlet of the vessel to permit drawing a vacuum on a filter cake formed on the screen.

In the test procedure, an aqueous asbestos-cement slurry is flowed through the vessel and particles in the slurry build up to form a filter cake on the screen. Vacuum pulls water through the cake of built-up material on the screen and into the collection flask.

The quantity of water gathered in the collection flask in a given period of time is measured as is the thickness of the material that builds up on the screen. The milliliters of collected water is multiplied by a factor of 0.0833, and the dry weight in grams of the material collected by the screen is multiplied by a factor of 4.0. The average value of the products of these multiplication operations is the Fiberator Index. It is an empirical value that enables accurate prediction of the actual filtration characteristics of an aqueous slurry of fibrous materials when the slurry is subjected to a rotary vacuum cylinder moving through a vat containing the slurry, the procedure used in a common commercial wet machine for making asbestos-cement products.

The fibers tested for the results shown in Tables I and II were Grade 4, as determined in accordance with the standard Quebec Asbestos Mining Association (QAMA) grading system.

TABLE I

| Example | Fiber Treatment | Fiberator Index |
|---|---|---|
| 1 | (No Treatment) | 51 |
| 2 | (0.5% Silicate) | 59 |
| 3 | (1% Silicate) | 78 |
| 4 | (1% Silicate +0.37% Tamol) | 87 |

Comparing the results of Example 4, which includes fibers treated in accordance with the invention, with the results of the other examples shows that one index of filter-ability is increased by the dual treatment process of this invention.

EXAMPLES 5-8

In these examples, chrysotile asbestos fibers, while air-suspended, are initially sprayed with a 20 percent aqueous solution of sodium silicate solids to deposit 1 percent by weight of silicate solids on the fibers. Subsequently, 0.4 percent by weight of Tamol is applied to the fibers either by blowing dry powder into the cyclone used to collect the silicate-treated fibers prior to packaging, or by recycling the silicate-treated fibers past the zone used to initially spray on the silicate, and spraying an aqueous solution of Tamol onto the silicate-treated fibers. These fibers are compared with untreated fibers and fibers treated only with 1 percent silicate. The weight percentages expressed above are based on the weight of untreated asbestos fiber.

The fibers are incorporated in a 7 percent solids slurry of the type commonly used in making asbestos cement pipe and processed on a small wet machine. The solids in the slurry comprise approximately 20 percent fiber, 32 percent silica, and 48 percent Portland cement.

The small wet machine is a conventional board-making type of machine having a mixing tank wherein a slurry, comprising asbestos fibers, hydraulic cement and silica as the particulate material is prepared. The solids forming the slurry are filtered onto a cylinder mold in a vat and transferred as a continous layer or filter mat onto a felt which carries the layer to an accumulator roll where the layer is rolled into a plurality of laminations. When the desired number of laminations have been formed on the accumulator roll, a longitudinal cut is made and the laminated layers are removed from the accumulator roll as a unitary sheet which is then pressed and subjected to conventional asbestos-cement curing operations.

The products are then tested to determine their strength properties and the production rates are noted. Table II below lists the results of these tests.

TABLE II

| Example | 5 | 6 | 7 | 8 |
|---|---|---|---|---|
| Weight % Silicate (basis fiber) | 1% | None | 1% | 1% |
| Weight % Tamol | | | | |

| | | | | |
|---|---|---|---|---|
| (basis fiber) | None | None | 0.4% | 0.4% |
| Fiberator Index | 56 | 53 | 69 | 74 |
| Modulus of Rupture (Kg/cm$^2$) | 460.7 | 506.4 | 535.4 | 499.4 |
| Density (gm/cc) | 1.774 | 1.751 | 1.778 | 1.754 |
| Thickness (mm) | 5.85 | 4.703 | 7.76 | 7.70 |
| Production Rate (lb. Product per hr. per ft. of Product width | 301 | 239 | 400 | 392 |
| Comments | | | Tamol added as a dry powder | Tamol added by spraying as an aqueous solution |

In analyzing the results of Examples 5–8, it is apparent from Examples 5 and 6 that a 1 percent silicate treatment by itself increased the production rate from 239 for an untreated fiber to 301 (in the units stated in the table), but the strength of the asbestos-cement pipe produced from these fibers decreased considerably from a modulus of rupture of 506.4 to 460.7 kg/cm$^2$. In contradistinction, however, Examples 7 and 8 show that the dual treated fibers of the present invention possess a desirable combination of superior filtration characteristics and the ability to produce strong asbestos-cement products. As is apparent from Example 8, the addition of only 0.4 percent Tamol added as a spray of an aqueous solution upgraded the strength the 1 percent silicate treated fibers from 460.7 to 499.4 Kg/cm$^2$, almost to the level of the untreated fibers (506.4), and yet the dual treated fibers were able to vastly improve production rates for asbestos-cement pipe to 392 from 239 for the untreated fibers and from 301 for the silicate treated fibers. Example 7 shows that even more surprising results can be obtained by adding 0.4 percent Tamol as a dry powder to fibers previously treated with 1 percent silicate. The use of such dual treated fibers produced the highest production rate (400), considerably above those of the untreated or 1 percent silicate treated fibers. Moreover, the strength of the asbestos-cement pipe formed from these dual treated fibers improved to a level above that of pipe formed from the untreated fibers (535.4 vs. 506.4 Kg/cm$^2$) and much above that of pipe formed from 1 percent silicated treated pipe. It can be concluded that by following the teachings of this invention, higher production rates can be accomplished with minimized loss in strength in the final product and in some cases with increased strength over products formed from untreated fibers.

In addition to the use of alkali metal silicate, colloidal silica can also be used in the present invention in the same amounts as the silicate to produce silica coated fibers. Such material would be applied in the same manner, as by spraying, and would be introduced in the form of suspended colloidal silica. An example of suitable material is that sold under the trademark Ludox.

It is to be understood that variations and modifications of the present invention may be made without departing from the spirit of the invention. It is also to be understood that the scope of the invention is not to be interpreted as limited to the specific embodiment disclosed herein, but only in accordance with the appended claims when read in the light of the foregoing disclosure.

I claim:

1. An asbestos fiber product having improved filtration and good strength characteristics and capable of being packaged and stored, comprising: chrysotile asbestos fibers at least partially coated with at least about 0.4 percent by weight of material selected from the group consisting of alkali metal silicate solids, silica and mixtures thereof, and having a non-foaming anionic sulfonated dispersant distributed on the surface of the coated fibers.

2. The product of claim 1 including up to about 2 percent by weight, based on the weight of the fiber, of alkali metal silicate solids and from about 0.05 to about 5.0 percent by weight based on the weight of the fiber of a non-foaming anionic sulfonated dispersant.

3. The product of claim 2 in which the dispersant comprises a sodium salt of condensed naphthalene sulfonic acid.

4. A process for producing an asbestos fiber product that possesses improved filtration characteristics and improving the production rate of asbestos cement articles without decreasing the strength of such articles comprising: applying a spray comprising material selected from the group consisting of an aqueous solution of alkali metal silicate, suspended colloidal silica and mixtures thereof, to asbestos fiber while maintaining the fiber in an air suspension to deposit at least about 0.4 percent by weight of solids on the air-suspended fibers, and subsequently adding a non-foaming anionic sulfonated dispersant to the fiber to distribute said dispersant on said fibers.

5. The process of claim 1 in which the non-foaming anionic sulfonated dispersant is added to the fiber as a dry powder.

6. The process of claim 1 in which the non-foaming anionic sulfonated dispersant is placed in an aqueous solution and sprayed on the fiber.

7. The process of claim 1 in which the anionic sulfonated dispersant is added in amounts from about 0.05 to about 5.0 percent by weight based on the weight of the asbestos fiber.

8. The process of claim 7 in which the sulfonic acid derivative is a sodium salt of condensed naphthalene sulfonic acid.

9. The process of claim 1 in which the alkali metal silicate is selected from the group consisting of sodium and potassium silicates and mixtures thereof.

10. The process of claim 9 including depositing from about 0.5 to about 2 percent by weight of alkali metal silicate solids on the fibers.

* * * * *